3,746,556
CHEMICALLY RESISTANT ALUMINOPHOSPHATE GLASSES
David W. Morgan, Corning, N.Y., assignor to Corning Glass Works, Corning, N.Y.
No Drawing. Filed Oct. 12, 1971, Ser. No. 188,483
Int. Cl. C03c 3/12, 3/16, 3/30
U.S. Cl. 106—47 R      7 Claims

ABSTRACT OF THE DISCLOSURE

Glasses resistant to chemical attack, in particular attack by fluorides, are disclosed. These are aluminophosphate base glasses containing one or more alkali metal oxides, with or without zinc or cupric oxide, as modifying oxides. The glass compositions consist essentially, on a mole percent basis, of 60–75% $P_2O_5$, 20–25% $Al_2O_3$, 1.5–12% $R_2O$, and 0–12% ZnO plus CuO, the total $R_2O$ plus ZnO being at least 3%.

---

The invention relates to modified aluminophosphate glasses that are particularly useful because of their resistance to attack by moisture and by acid solutions, especially etching solutions containing fluorides.

The chemical reaction of fluorides, in particular fluoride acids, with silicate glasses, a reaction termed "etching," is well known in the glass art. Etching is very useful for some purposes such as incandescent lamp frosting and glass scribing. However, it presents a problem of providing transparent containers and equipment for use with etching solutions.

This problem has become aggravated recently by the sudden growth of the silicon segment of the semiconductor art. In particular, a need has arisen for transparent glass substrates to act as temporary carriers for the silicon wafers, and for glass equipment to use in a process where the silicon wafer is etched in a mixture of acetic, nitric and hydrofluoric acids.

It has been recognized for at least fifty years that phosphate glasses may be rendered resistant to fluoride attack. However, production of phosphate glasses has raised numerous problems. One major problem is the avoid the affinity of phosphoric oxide for water. Another is to avoid excessive volatilization of batch, both $P_2O_5$ and other oxides, during melting. Finally, many phosphate melts have a strong tendency to crystallize, thus making it extremely difficult to cool the melt to a glass, at least if glassworking and shaping operations are involved.

United States Pat. No. 1,570,202, granted Jan. 19, 1926 to E. C. Buck, describes and RO-$Al_2O_3$-$P_2O_5$ family of glasses as having high resistance to the attack of fluoride acids. These glasses are composed essentially wholly of $P_2O_5$, $Al_2O_3$ and CaO or MgO with the molar content of RO exceeding the molar content of $Al_2O_3$.

United States Pat. No. 2,381,925, granted to A. G. Pincus on Aug. 14, 1945, discloses an aluminum metaphosphate base glass containing ZnO, BeO, or PbO as an additive to improve resistance to fluoride attack and to improve melting. The alkaline earth family is excluded and alkali metals are limited to 0.1% or less.

A later patent granted to A. G. Pincus on Dec. 4, 1951, United States Pat. No. 2,577,627, discloses that the ZnO-$Al_2O_3$-$P_2O_5$ glasses of Pat. No. 2,381,925 can be improved for large scale commercial production by employing a relatively high $P_2O_5$ content and substituting $B_2O_3$ for $Al_2O_3$ in part. The resulting glasses contain, in percent by weight, 72 to 85% $P_2O_5$, 5 to 9% $Al_2O_3$, one to 8% $B_2O_3$, one to 12% of the divalent metal oxides ZnO, MgO, BeO and CaO, and less than one percent of alkali metal oxide.

Phosphate glasses have also been widely studied for such diverse purposes as enamels, optical glasses and heat absorption. For example, United States Pat. No. 1,981,603, granted to Berger on June 5, 1934, discloses boro-aluminophosphate glasses for heat absorbing purposes. Also, United States Pats. No. 2,278,501 granted to Tillyer and Moulton on Apr. 7, 1942 and No. 2,284,05 granted to Huniger and Panke on May 2, 1942 disclose a variety of modified phosphate glasses for radiation absorbing purposes.

The second Pincus patent discussed above summarizes the requirements of a fluoride resisting glass as:
 (1) High resistance to attack by fluorides in general and by hydrofluoric acid in particular,
 (2) Readily fabricated by commercial means,
 (3) Readily reworked or fabricated without loss of transparency or homogeneity,
 (4) High resistance to water or moisture attack, and
 ( ) Moderate thermal expansion coefficient and resistance to thermal shock.

These various requirements, in particular the second and third, imply a strong resistance to devitrification. This, in turn, requires a relatively low liquids temperature and a resistance to crystallization even at that temperature. In addition to providing these various desirable characteristics to a high degree, the glass compositions of the present invention minimize the tendency of phosphate glass batches to volatilize excessively during melting. Further, they enable achieving certain desirable color or optical filter effects.

The problems of melting and working phosphate glasses have long been recognized in the prior art, and various special melting methods have been advanced. For example, United States Pat. No. 2,434,281, granted to Moulton on Jan. 13, 1948, proposes prereaction of batch constituents to permit lower melting temperatures and less batch inhomogeneity. United States Pat. No. 2,294,844, granted to Gelstharp on Sept. 1, 1942 proposes to avoid volatilization losses by limiting the batch to selected phosphates.

Nevertheless, there has still not been available a phosphate glass having the various technical requirements for a fluoride resisting glass, and also capable of being readily melted and worked by normal glassworking procedures. It is then a primary purpose of the invention to provide such glasses. A specific purpose is to provide a fluoride resisting glass that also has good moisture resistance. Another specific purpose is to provide an aluminophosphate glass that can be melted under normal conditions without excessive volatilization. A further specific purpose is to provide an aluminophosphate glass modified in a novel manner and having good resistance to fluoride attack.

Contrary to prior belief and teachings, I have now found that one or more alkali metal oxides can be used in limited amounts to flux an aluminophosphate melt to produce fluoride resistant aluminophosphate glasses. Quite surprisingly, I have further found that the alkali metal oxides have distinct advantages over other fluxes known and used for this purpose. Specifically, I have found that limited amounts of the alkali metal oxides not only provide good resistance to fluoride attack, but also provide a glass that has a surprising degree of resistance to attack by other acids, such as hydrochloric, and by moisture.

I have further found that the volatilization problem can be minimized by maintaining the alumina ($Al_2O_3$) content relatively high, preferably approximating a molar ratio, with respect to $P_2O_5$, of 1:3. Surprisingly, boric oxide ($B_2O_3$) is not an effective substituted for $Al_2O_3$ in this respect, and is preferably avoided entirely in the glass composition.

Based on these and other discoveries, the present invention is a chemically resistant aluminophosphate glass consisting essentially, as calculated on an oxide basis in mole percent from the batch, of 60–75% $P_2O_5$, 20–25% $Al_2O_3$, 1.5–12% $R_2O$ and 0–12% ZnO plus CuO, the total $R_2O$ plus ZnO plus CuO content being at least 3%. A rough approximation of the corresponding weight percent ranges is: 68–80% $P_2O_5$, 15–20% $Al_2O_3$, 0.5–6% total $R_2O$, 0–12% ZnO plus CuO, the total $R_2O$ plus ZnO plus CuO being at least 1.5%.

In preferred embodiments, the alkali metal oxide content is within the range of 4–8 mole percent, and is composed of three oxides, lithia ($Li_2O$), soda (NaO), and potassia ($K_2O$), in equal molar amounts. In further preferred embodiments, the $Al_2O_3$ and $P_2O_5$ contents are in an approximate molar ratio of 1:3 and the total $R_2O$ plus RO content does not exceed about 12 molar percent.

$P_2O_5$ is the basic glass forming oxide and provides the basis for resistant to chemical attack, in particular fluoride attack. $Al_2O_3$ combines and coordinates with the $P_2O_5$ in glass formation. When present in sufficiently large amounts, it minimizes the tendency of $P_2O_5$ to volatilize and also imparts chemical resistance to the resulting glass, in particular resistance to moisture attack. At least 20 mole percent $Al_2O_3$ and 60 mole percent $P_2O_5$ must be present for these purposes. Compositions containing over 25% $Al_2O_3$ become difficult to melt. In general a 1:3 molar ratio of $Al_2O_3$ to $P_2O_5$ provides optimum glass stability, both during the melting operation and during subsequent exposure to chemical attack in service.

A simple binary aluminophosphate glass provides good resistance to chemical attack, in particular fluoride reaction. However, such a glass is too difficult to melt and form. Therefore, it is necessary to provide modifying oxides which essentially act as fluxes. Heretofore, it has been considered that alkali metal oxides should generally be avoided in producing fluoride resistant glasses, and that one or more divalent metal oxides, in particular zinc oxide, should be used as the fluxing agent.

The present invention represents a basic departure from this prior practice. Specifically, the present invention requires at least one alkali metal oxide, preferably a mixture of three, as the primary flux agent. This is essentially a replacement of the divalent metal oxides by alkali metal oxides. However, bivalent metal oxides may still be present, and zinc or copper oxide may be required if the content of alkali metal oxide is sufficiently small.

At least 1.5 mole percent of alkali metal oxide ($R_2O$) must be present for flux purposes, and a content in the range of 4–8% is generally preferred in the absence of other modifying oxides. Above about 8 mole percent alkali oxide the fluxing power diminishes and the glass becomes more difficult to melt. Accordingly, the total alkali metal oxide content should not exceed about 12%.

The addition of alkali metal oxide to an aluminophosphate glass substantially lowers the glass liquidus temperature thus providing greater flexibility in working and shaping the glass. The use of alkali metal oxide as a flux agent also has been found to provide a strong resistance to chemical attack that is substantially greater than the comparable chemical durability imparted by corresponding amount of bivalent metal oxide modifier. This is particularly true with respect to moisture attack, a well-recognized and serious problem with phosphate glasses.

The present invention does not employ the divalent metal oxides as primary flux agents. Nevertheless, they may be present as optional or secondary flux materials. Furthermore, if the alkali metal oxide content falls below a total of 3 mole percent, then it must be supplemented by zinc and/or copper oxide to provide a total modifying oxide content of at least 3 mole percent.

The supplemental presence of zinc oxide is particularly desirable when a glass is to be subjected to heat treatment at temperatures near the annealing temperature, for example in annealing or in working of the glass. The presence of zinc oxide inhibits a surface devitrification which otherwise tends to occur during such heat treatment. The presence of CuO normally imparts color to the glass, and is employed where special color or optic effects are desired.

Other divalent metal oxides, e.g. PbO, BaO, and MgO, may be present in minor amounts for adjustment of glass properties, but do not function as substitutes for the alkalies, or for ZnO or CuO. In general, the fluxing power of the divalent metal oxides tends to diminish as their content becomes greater than about 6 mole percent. Accordingly, it is preferable to avoid a combined content of alkali metal and divalent oxides greater than about 12 mole percent.

Minor amounts of other compatible glassmaking oxides may be present if desired for secondary purposes. These include the known glass colorants and fining agents as well as the divalent metal oxides mentioned above.

Silica must be avoided in fluoride resisting glasses, except as trace amounts that may appear due to impurities. It is also desirable to avoid the presence of boric oxide ($B_2O_3$), although minor amounts of this oxide do not have the harmful effects of silica. As pointed out earlier, boric oxide is not an effective substituted for alumina in the present glasses because it contributes substantially to the volatilization problem. This is due to its own volatile nature, as well as to the fact that it fails to stabilize the $P_2O_5$.

In melting the present glasses, a batch may be mixed from conventional raw materials such as aluminum metaphosphate, ammonium acid phosphate, phosphoric acid, hydrated alumina, alkali metal and divalent metal phosphates and/or other salts and/or oxides, e.g. sodium nitrate and zinc oxide.

The batch may be melted in conventional manner. Conveniently the batch may be melted in an electrically heated unit, homogenized if desired, and the molten glass extruded through a carbon mold, or otherwise molded in desired shape. In producing cylindrical water to proudce dry gaged cullet. This may then be remelted in an elongated cylindrical mold and the glass cylinder cut into thin discs which are ground and polished.

The invention is further described with reference to Table I which sets forth, in both weight and mole percent as calculated from the glass batch on an oxide basis, the compoistions of several glasses illustrating the invention.

TABLE I

| | Weight percent | | | | | | | |
|---|---|---|---|---|---|---|---|---|
| | 1 | 2 | 3 | 4 | 5 | 6 | 7 | 8 |
| $P_2O_5$ | 77.5 | 75.3 | 79.1 | 79.3 | 77.7 | 79.1 | 77.5 | 77.3 |
| $Al_2O_3$ | 18.6 | 18.0 | 19.0 | 18.8 | 18.4 | 18.9 | 18.6 | 18.5 |
| $Li_2O$ | 0.6 | 0.6 | 0.3 | ---- | ---- | 0.5 | 0.9 | ---- |
| $Na_2O$ | 1.3 | 1.5 | 0.6 | 1.9 | 3.9 | ---- | ---- | 0.5 |
| $K_2O$ | 2.0 | 2.0 | 1.0 | ---- | ---- | 1.5 | 3.0 | 3.7 |
| ZnO | ---- | 2.6 | ---- | ---- | ---- | ---- | ---- | ---- |

| | Mole percent | | | | | | | |
|---|---|---|---|---|---|---|---|---|
| $P_2O_5$ | 69.0 | 67.5 | 72 | 72 | 69 | 72 | 69 | 72 |
| $Al_2O_3$ | 23.0 | 22.5 | 24 | 24 | 23 | 24 | 23 | 24 |
| $Li_2O$ | 2.66 | 2.66 | 1.33 | ---- | ---- | 2 | 4 | ---- |
| $Na_2O$ | 2.66 | 2.66 | 1.33 | 4.0 | 8 | ---- | ---- | 1 |
| $K_2O$ | 2.66 | 2.66 | 1.33 | ---- | ---- | 2 | 4 | ---- |
| ZnO | ---- | 2.0 | ---- | ---- | ---- | ---- | ---- | 3 |

| | Mg./cm.] | | | | | | | |
|---|---|---|---|---|---|---|---|---|
| Weight loss after— | | | | | | | | |
| 1 hourg | 0.01 | 0.06 | 0.03 | 0.01 | 0.02 | 0.06 | 0.05 | 0.04 |
| 4 hours | 0.05 | 0.17 | 0.14 | 0.05 | 0.08 | 0.10 | 0.21 | 0.13 |

Batches corresponding to the compositions in Table I were formulated and mixed from conventional glassmaking materials. Each batch was melted 4 hours at 1450° C. in a crucible positioned in an electrically heated chamber. The glasses were cast, and discs cut from the casting and polished.

Durability measurements were made on each glass by immersing samples in a standard silicon wafer etching solution consisting of one part hydrofluoric acid (HF), four parts nitric acid ($HNO_3$) and three parts acetic acid ($HC_2H_3O_2$). One sample of each glass was removed after an hour exposure and a second sample of the same glass after four hours. The samples were carefully measured and weighed before and after exposure. The glass lost by reaction with the etching solution was determined in milligrams per square centimeter of sample surface (mgs./cm.$^2$), and the values are recorded for each composition in Table I.

Heretofore, divalent metal oxides, more particularly zinc oxide (ZnO), have been proposed and use as fluxing agents in aluminophosphate glasses to provide fluoride resistant products. Table II compares two such prior glasses, designated as glasses A and B, with two glasses of the present invention, in particular Examples 1 and 3 of Table I. Each glass composition is set forth in both mole and weight percent.

In the interest of convenience, a durability test was performed on these glasses that differed slightly from that described above. The same etching solution was used, but one square centimeter samples of each glass were immersed for one hour and 25 hours, respectively. Sample weight was checked before and after exposure and weight loss was calculated in terms of percent loss, that is weight loss divided by original sample weight. The calculated values are shonw in Table II under the designation "Wt. Loss Percent."

TABLE II

|  | A (percent) | | 3 (percent) | | B (percent) | | 1 (percent) | |
| --- | --- | --- | --- | --- | --- | --- | --- | --- |
|  | Mol. | Wt. | Mol. | Wt. | Mol. | Wt. | Mol. | Wt. |
| $P_2O_5$ | 72 | 76.7 | 72 | 79.1 | 69 | 72.9 | 69 | 77.5 |
| $Al_2O_3$ | 24 | 18.4 | 24 | 19.0 | 23 | 17.5 | 23 | 18.6 |
| ZnO | 4 | 4.9 |  |  | 8 | 9.7 |  |  |
| $Li_2O$ |  |  | 1.33 | 0.3 |  |  | 2.66 | 0.6 |
| $Na_2O$ |  |  | 1.33 | 0.6 |  |  | 2.66 | 1.3 |
| $K_2O$ |  |  | 1.33 | 1.0 |  |  | 2.66 | 2.0 |
| Wt. loss percent after— |  |  |  |  |  |  |  |  |
| 1 hour | 0.04 |  | 0.00 |  | 0.35 |  | 0.00 |  |
| 25 hours | 0.49 |  | 0.15 |  | 3.40 |  | 0.08 |  |

It is readily apparent that the present glasses, modified by alkali metal oxides, provide a resistance to etching acid attack that is markedly superior to that provided by prior glasses containing only ZnO as a flux. Standard moisture and acid attack tests, e.g. a standard HCl test, have demonstrated that the present phosphate glasses have superior durability characteristics in these respects as well. Therefore, while the new glasses are particularly adapted to use with etching acids, they may also find use in color filter and other optics applications where special transmission effects are required in conjunction with reasonably good moisture and/or acid resistance.

By way of specific example, a glass was melted having the following composition in mole and weight percent, respectively, as calculated on the oxide basis:

|  | Mol. percent | Wt. percent |
| --- | --- | --- |
| $P_2O_5$ | 67.7 | 75.5 |
| $Al_2O_3$ | 23.1 | 18.5 |
| CuO | 6.4 | 4.0 |
| $WO_3$ | 0.75 | 1.0 |
| $Li_2O$ | 0.65 | 0.15 |
| $Na_2O$ | 0.75 | 0.36 |
| $K_2O$ | 0.65 | 0.48 |

The glass melt was cast in the form of small discs which were ground and polished to a uniform thickness for visible or color transmission measurements.

Samples of the glass were subjected to a variety of different chemical durability tests. These included a weight loss test in silicon etching solution as described earlier with respect to the glasses of Table I. The present glass lost 0.07 mg./cm.$^2$ in one hour and 0.30 mg./cm.$^2$ in four hours. In general, the durability is much better than a glass fluxed with ZnO alone, but somewhat below that of an all alkali metal oxide fluxed glass.

Exposure of the glass to a 5% HCl solution for 24 hours at 95° C. showed a loss of 0.66 mgs./cm.$^2$. Correspondingly, a similar test in water caused a loss of less than 0.01 mg./cm.$^2$. Thus, the glass is quite acceptable for optical applications.

This glass is characterized by a bluish-green color which closely matches human eye sensitivity. Hence it is particularly useful in producing a filter for a photographic device. The copper oxide serves the dual function of supplementing the flux action of the alkali metal oxides and cooperating with the tungstic oxide to produce the desired transmission characteristics.

It was stated earlier that the alumina level in the present glasses must be maintained relatively high in order to avoid severe batch volatilization during melting. In particular, it was pointed out that boric oxide could not be effectively used as an alumina substitute in the present glasses.

This sensitivity was demonstrated by a series of four melts, the compositions of which are set forth in Table III in wegiht percent on an oxide basis. Examples C and D are glasses proposed in the prior art as fluoride resistant, aluminophosphate glasses that are fluxed with zinc oxide and wherein an amount of $B_2O_3$ is also substituted for alumina to soften the glass. Example 1 corresponds to Example 1 of Table I and Example 9 is a modification of Example 1 wherein $B_2O_3$ is substituted for both $Al_2O_3$ and $P_2O_5$ to soften the glass. It will be noted that the molar ratio of the latter two oxides is maintained essentially constant from Example 1 to Example 9.

TABLE III

|  | C | D | 1 | 9 |
| --- | --- | --- | --- | --- |
| $P_2O_5$ | 75 | 85 | 77.5 | 73.5 |
| $Al_2O_3$ | 5 | 9 | 18.6 | 17.8 |
| $B_2O_3$ | 8 | 1 |  | 4.6 |
| $Li_2O$ |  |  | 0.6 | 0.7 |
| $Na_2O$ |  |  | 1.3 | 1.3 |
| $K_2O$ |  |  | 2.0 | 2.1 |
| ZnO | 12 | 5 |  |  |

Four glass batches, each based on the compositions in Table III and calculated to produce 400 grams of glass, were mixed from conventional raw materials. Each batch was melted in a platinum crucible in an electrically heated furnace by holding in such furnace at 1450° C. for two (2) hours. This was found to be the minimum melting conditions for producing a reasonably clear melt.

Normally, such a melt yields 320–340 grams of glass, and the yields from melts of Examples 1 and 9 were in this range. The comparable melts based on Compositions C and D gave off heavy fumes and yielded approximately one hundred (100) grams of glass each. This clearly indicates that, while $B_2O_3$ can be present in the glasses, it cannot be added at the expense of, or in substitution for, alumina.

I claim:

1. A chemically resistant aluminophosphate glass consisting essentially, as calculated on an oxide basis in mole percent from the batch, of 60–75% $P_2O_5$, 20–25% $Al_2O_3$, 1.5–12% $R_2O$, wherein said $R_2O$ consists of at least one alkali metal oxide selected from the group consisting of Li$_2$O, Na$_2$O, and K$_2$O, and 0–12% ZnO plus CuO wherein the total R$_2$O plus ZnO plus CuO is at least 3%.

2. An aluminophosphate glass in accordance with claim 1 wherein the total R$_2$O content is in the range of 4–8 mole percent.

3. An aluminophosphate glass in accordance with claim 1 wherein the total R$_2$O plus ZnO plus CuO content is not over 12 mole percent.

4. An aluminophosphate glass in accordance with claim 1 wherein the molar ratio of Al$_2$O$_3$ to P$_2$O$_5$ is approximately 1:3.

5. An aluminophosphate glass in accordance with claim 1 wherein the glass composition contains up to 12% ZnO.

6. An aluminophosphate glass in accordance with claim 1 wherein the glass composition contains up to 12% CuO.

7. An aluminophosphate glass in accordance with claim 1 wherein the glass composition is essentially free of B$_2$O$_3$.

References Cited

UNITED STATES PATENTS

| 2,294,844 | 9/1942 | Gelstharp | 106—47 R |
| 2,381,925 | 8/1945 | Pincus | 106—47 R |
| 2,434,281 | 1/1948 | Moulton | 106—47 R |

WINSTON A. DOUGLAS, Primary Examiner

M. L. BELL, Assistant Examiner

UNITED STATES PATENT OFFICE
CERTIFICATE OF CORRECTION

Patent No. 3,746,556          Dated July 17, 1973

Inventor(s) David W. Morgan

It is certified that error appears in the above-identified patent and that said Letters Patent are hereby corrected as shown below:

Column 2, line 6, change "2,284,05" to -- 2,284,055 --.

Column 2, line 7, change "May 2, 1942" to -- May 26, 1942 --.

Column 2, line 22, change "liquids" to -- liquidus --.

Column 3, line 19, change "resistant" to -- resistance --.

Column 3, line 52, before "oxide" insert -- metal --.

Column 4, line 24, change "substituted" to -- substitute --.

Column 4, line 39, after "cylindrical" insert -- discs for substrates, the melt may, alternatively, be cast into --.

Column 4, line 64, change "Mg./cm.]" to -- $Mg./cm.^2$ --.

Signed and sealed this 18th day of December 1973.

(SEAL)
Attest:

EDWARD M. FLETCHER, JR.         RENE D. TEGTMEYER
Attesting Officer                 Acting Commissioner of Patent